Aug. 19, 1930.  J. G. TANDBERG  1,773,381
CLEANER
Filed June 9, 1927   3 Sheets-Sheet 1
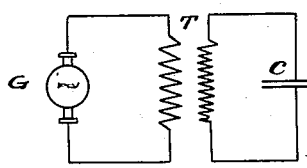
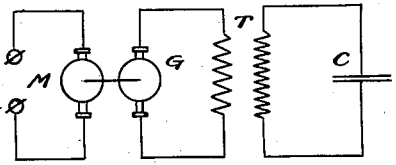
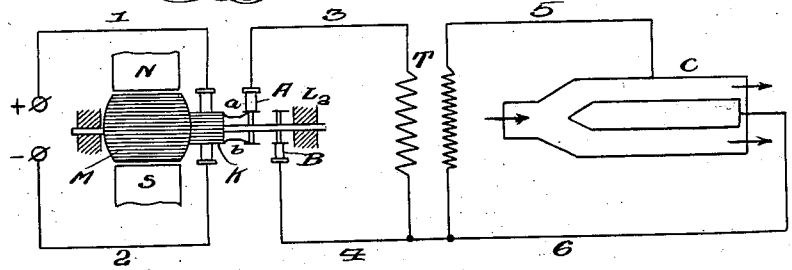
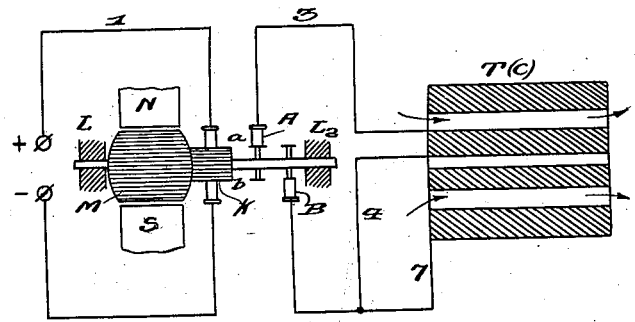
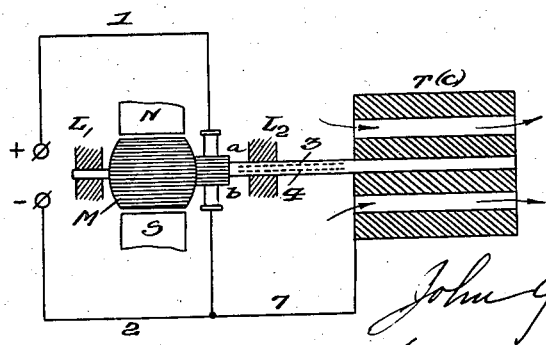
Inventor
John G. Tandberg
By Hedlund & Frucht
his Attorneys Aug. 19, 1930.  J. G. TANDBERG  1,773,381
CLEANER
Filed June 9, 1927     3 Sheets-Sheet 2
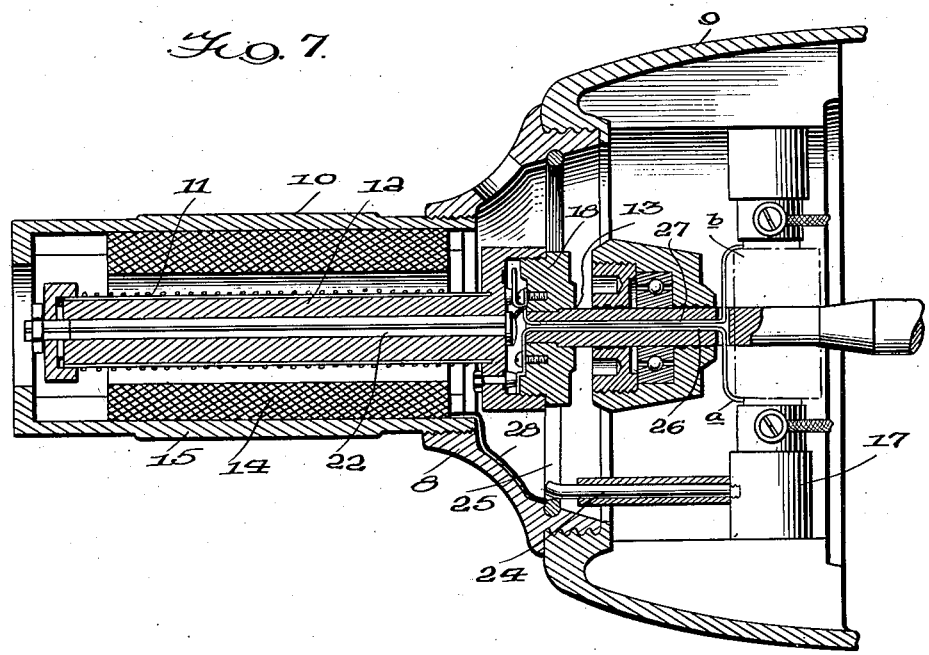
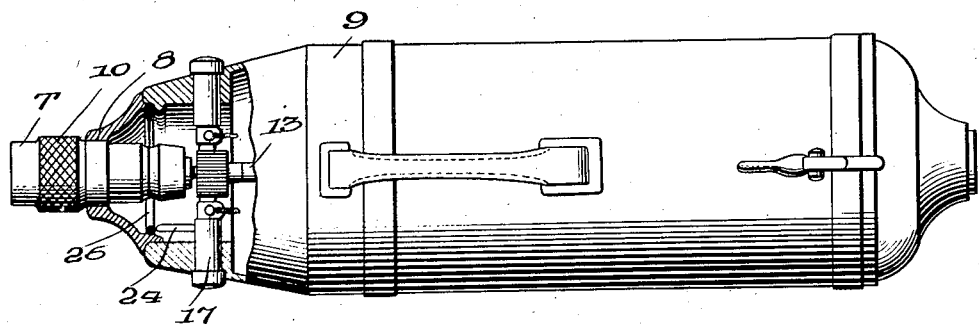

Aug. 19, 1930.    J. G. TANDBERG    1,773,381
CLEANER
Filed June 9, 1927    3 Sheets-Sheet 3
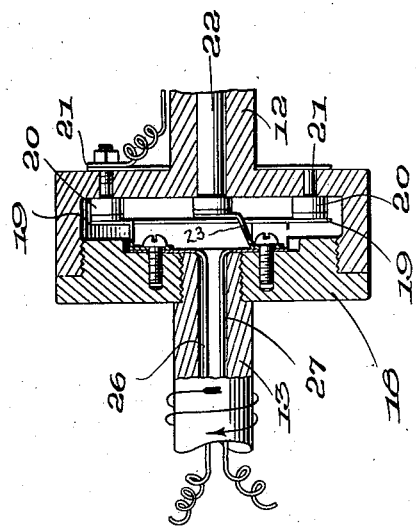
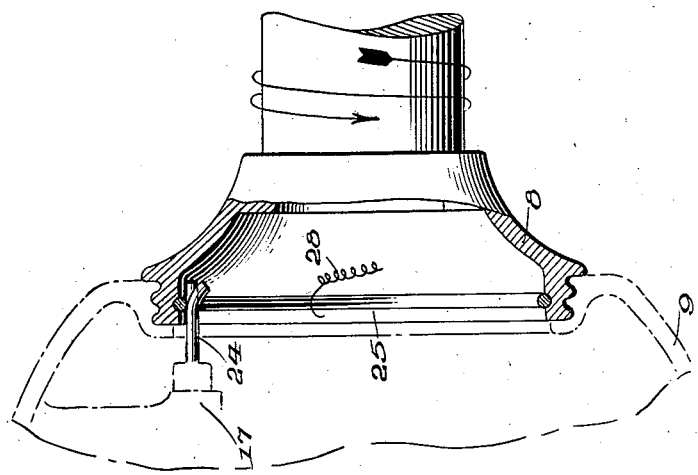

Patented Aug. 19, 1930

1,773,381

UNITED STATES PATENT OFFICE

JOHN GUDBRAND TANDBERG, OF STOCKHOLM, SWEDEN, ASSIGNOR TO INVENTIA PATENT-VERWERTUNGS-GESELLSCHAFT, OF SCHAFFHAUSEN, SWITZERLAND, A CORPORATION OF SWITZERLAND

CLEANER

Application filed June 9, 1927, Serial No. 197,749, and in Sweden June 10, 1926.

It is known that with electrical discharges in the atmospheric air the oxygen of the air is transformed partly into ozone which has a purifying and disinfecting effect on the air. In order to obtain such a production of ozone it is not necessary to provide visible discharge phenomena such as sparks or voltaic arcs but it is sufficient if the air is exposed to a variable voltage field of sufficient voltage whereby so-called silent discharge takes place which effects the production of ozone.

It has already been proposed to cause the air in a room for purifying and disinfecting purposes to flow between the layers of foil of a condenser. The condenser is supplied with an alternating current voltage of, for example, from 5–10,000 volts. It is also known to provide a condenser producing ozone, a so-called ozonizer in connection with the motor of a suction cleaner in such a manner that the ozonizer is electrically connected either with the motor itself or with an alternating current generator driven by the motor. The air stream flowing through the suction cleaner is purified firstly mechanically by means of a suitable filter device and then electrically in the ozonizer before being supplied again to the room. If the motor is driven with continuous current it is assumed that a converter of suitable type is provided which supplies the necessary alternating current. With a suction cleaner having an alternating current motor the low voltage alternating current can, however, be taken direct from the motor of the suction cleaner. With suction cleaners driven by continuous current there is necessitated, however, on the one hand a converter in order to produce low voltage alternating current and on the other hand a voltage transformer in order to transform from low tension alternating current from, for example, 5–10,000 volts in order to charge the ozone-forming condenser.

The present invention relates to suction cleaners driven with continuous current which are provided with an ozonizer electrically connected to the motor of the suction cleaner and more particularly to the simplification of transformation arrangements in such apparatus.

The invention also contemplates eliminating use of a converter and instead taking the necesasry alternating current energy directly from the commutator of the direct current motor.

The invention consists further of unification of the condenser, ozonizer and voltage transformer therefor, in which the voltage transformer itself is utilized as a charging condenser so that the production of ozone is effected between the primary and secondary windings of the transformer.

The invention will be hereinafter described with reference to the drawings.

Fig. 1 shows diagrammatically an arrangement of ozonizer connected with an alternating current generator.

Fig. 2 shows the same arrangement with an alternating current generator driven from a continuous current motor.

Fig. 3 shows an arrangement of the ozonizer connected with a motor of dust suction apparatus driven with continuous current in accordance with the invention.

Fig. 4 is a simplified arrangement of the voltage transformer of the ozonizer formed simultaneously as a condenser for producing ozone.

Fig. 5 shows the same arrangement as Fig. 4 with the exception that in Fig. 5 the primary winding of the transformer is applied to the motor shaft.

Fig. 6 shows a vacuum cleaner partly in section with an ozonizer according to the invention mounted on the cleaner.

Fig. 7 shows the left part of the Fig. 6 in section.

Figs. 8 and 9 show constructional details which facilitate the application of the ozonizer to the cleaner.

In Fig. 1 G indicates an alternating current generator by which the transformer is supplied with variable alternating voltage. This voltage is transformed up in the transformer T and is delivered to the condenser C which discharges by means of so-called silent discharge with preferably an interval between the layers of condenser foil in proportion to the value of the voltage. An air stream which flows between the layers of the condenser plates will, in consequence, be strongly ozonized.

Fig. 2 shows the same arrangement in which the alternating current generator G is mechanically driven by the continuous current motor M. The above mentioned two arrangements are already well known in electrically operated suction cleaners for alternating or direct current. The transformer T for transforming upwardly the alternating current voltage is always necessary for producing the high voltage between the plates of the condenser.

Fig. 3 shows an ozonizer for suction apparatus operated with continuous current in which the alternating current energy necessary for the ozonizer is transferred directly from the collector segments $a$ and $b$ to the slip-rings A and B. The motor is diagrammatically indicated in section in the drawings wherein N and S are two opposed magnet poles, K is the commutator, $L_1$ and $L_2$ bearings. The motor is fed from a source of continuous current through the feeders 1 and 2, and the current is supplied to the commutator by means of brushes in known manner. Between two such segments of the commutator of opposite polarity there is obtained during rotation a sine wave alternating current voltage which can be collected by connecting the two mentioned points $a$ and $b$ to two slip-rings A and B arranged on the motor shaft from which the conductors 3 and 4 convey the alternating current voltage to the primary winding of the transformer T. In the transformer T the voltage is transformed to the desired value. This is then conveyed by conductors 5 and 6 to the plates of the tube shaped condenser C between which the desired discharge with the consequent production of ozone takes place. The air is led between the plates of the condenser shortly before its exit from the dust suction apparatus after its flow through a primary filtering device and has been thereby purified mechanically of its dust particles. The air thus flows strongly ozonized out of the apparatus.

In Fig. 4 the arrangement according to the invention is so altered that the transformer T itself serves as a discharge condenser in such a manner that the production of ozone takes place between the primary and secondary windings in a cylindrical space existing between these two windings. The primary winding is as above mentioned connected to the slip-rings $a$ and $b$ by the conductors 3 and 4. Further, the secondary winding of the transformer is connected by the conductor 7 with any suitable current carrying point of the motor, for example, with a collector brush. The layers of the primary and secondary windings which lie adjacent the cylindrical space serve therefore as condenser plates. The air stream flows through the above-mentioned cylindrical space and is thereby ozonized.

In Fig. 5 is a still further simplified form in which the primary winding of the transformer is arranged together with its iron core on the spindle of the motor and axially therewith on the commutator side whereby the current carrying conductors are arranged within the spindle formed as a tubular shaft. In consequence, the slip-rings A and B are unnecessary and the points $a$ and $b$ of the commutator can be connected directly by means of the conductors 3 and 4 with the primary winding of the transformer. The conductors are therefore conveyed through the tubular shaft in order to pass through the bearings $L_2$. The secondary winding is as formerly connected by means of the conductor 7 to one of the commutator brushes. By surrounding the windings with a sleeve of insulating material the apparatus is protected against the voltage passing over to the motor and the suction cleaner casing. In the arrangement according to Fig. 4 or 5 transformer T is preferably arranged in the blowing aperture of the suction cleaner so that the ozonized air cannot flow into any part of the interior of the suction apparatus after it has passed the ozonizer but is blown directly out into the room.

In Fig. 6 a preferred embodiment of my invention is shown. The ozonizer T is connected to the cleaner casing 9 by means of a coupling member 8. In order to facilitate the application to and removal from the cleaner the outside of the ozonizer is provided with a stippling 10.

In Figs. 7, 8 and 9 the ozonizer and some constructional details are shown in section.

The primary winding 11 of the ozonizer is arranged on the shaft 12 and rotates with the motor spindle 13. The secondary winding 14, which is placed within a metal cover 15, is by means of the wire 28 electrically connected to the commutator brush 17.

If the ozonizer T is to be removed from the cleaner, the coupling member 8 with the cover 15 and the secondary winding 14 is unscrewed from the cleaner casing 9, after which the shaft 12 with the primary winding 11 is unscrewed from the coupling disc 18.

In order to obtain the electrical connections partly between the motor and the primary winding, partly between the secondary winding and the commutator brush the following arrangements are made.

The coupling disc 18 is provided with a contact ring 19 which is electrically connected to the commutator segment $a$, by means of the wire 26. The electric current from the contact ring 19 is transferred to the one end of the primary winding 11 by means of the slip contacts 20 and the metal ring 21. The other end of the primary winding is connected to a metal staff 22, which is placed within the shaft 12 and which lies against the contact 23 which is electrically connected to the commutator segment b, by means of the wire 27. The shaft 12 is suitably manufactured of some hard and strong insulating material, for instance ivory.

In order to obtain electrical contact between the one end of the secondary winding and a current carrying point of the motor, for instance the commutator brush 17 the latter is provided with the sliding contact 24 which slides against the contact ring 25 which is electrically connected to the secondary winding by means of the wire 28.

When the ozonizer is connected to the cleaner, the shaft 12 with the primary winding 11 is screwed on the coupling disc 18, which is connected with the motor spindle 13. As soon as the shaft 12 is screwed on enough the sliding contacts 20 make contact with the contact ring 19 and the metal staff 22 with the contact 23.

Now the coupling member 8 with the secondary winding 14 is screwed on the cleaner casing 9, whereby the sliding contact 24 slides against the contact ring 25 and thus obtains electrical connection between the brush 17 and the secondary winding.

While the preferred embodiment of the invention and certain preferred details of construction are herein shown and described, it is apparent that changes may be made and various features may be used without departing from the spirit of the invention.

Having thus described my invention, what I claim is:

1. A vacuum cleaner comprising in combination a casing and means for producing flow of air through said casing and purifying the air, said means comprising a direct current motor having an extended shaft, a transformer having primary and secondary windings, said primary winding being mounted on the motor shaft to rotate therewith, means supplying alternating current to said primary winding from the motor commutator and an electric connection between said primary and secondary windings, said primary and secondary windings being spaced to form ozonizing passages therebetween.

2. A vacuum cleaner comprising in combination a casing and means for producing flow of air through said casing and purifying the air, said means comprising a direct current motor having an extended shaft, a transformer having coaxial primary and secondary windings, said primary winding being mounted on the motor shaft to rotate therewith, means supplying alternating current to said primary winding from the motor commutator and an electric connection between said primary and secondary windings, said primary and secondary windings being spaced apart to form ozonizing passages therebetween.

3. A vacuum cleaner comprising in combination a casing and means for producing flow of air through said casing and purifying the air, said means comprising a direct current motor, a motor shaft therefor, a transformer primary winding mounted on said motor shaft, means supplying alternating current to said transformer from the motor commutator, a transformer secondary winding surrounding said transformer primary winding and an electric connection between the primary and secondary windings, said primary and secondary windings being spaced apart to form ozonizing passages therebetween.

4. A vacuum cleaner comprising in combination a casing and means for producing flow of air through said casing and purifying the air, said means comprising a direct current motor having a motor shaft and a commutator, said shaft having an extension on the commutator side, a transformer primary winding mounted on said shaft, conductors contacting with commutator segments of opposite polarity and connected to said transformer primary winding, a transformer secondary winding surrounding said transformer primary winding and an electric connection between the primary and secondary windings, said shaft having means therein for the reception of said conductors.

5. A vacuum cleaner comprising in combination a casing and means for producing flow of air through said casing and purifying the air, said means comprising a direct current motor having a motor shaft and a commutator, said shaft having an extension on the commutator side, a transformer primary winding mounted on said shaft, conductors contacting with commutator segments of opposite polarity and connected to said transformer primary winding, a transformer secondary winding surrounding said transformer primary winding and an electric connection between the primary and secondary windings, said shaft being hollowed for the reception of said conductors.

6. A vacuum cleaner comprising in combination a casing and means for producing flow of air through said casing and purifying the air, said means comprising a direct current motor having a motor shaft and a commutator, said shaft having an extension on the commutator side, a transformer primary winding mounted on said shaft, conductors contacting with commutator segments of opposite polarity and connected to said transformer primary winding, a transformer secondary winding surrounding said transformer primary winding, an electric connection between the primary and secondary windings, said shaft having means therein for the reception of said conductors and said windings being spaced apart to form an air passage therebetween.

7. A vacuum cleaner comprising in combination a casing and means for producing flow of air through said casing and purifying the air, said means comprising a direct current motor having a motor shaft and a commutator, said shaft having an extension on the commutator side, a transformer primary winding mounted on said shaft, conductors contacting with commutator segments of opposite polarity and connected to said transformer primary winding, a transformer secondary winding surrounding said transformer primary winding, and an electric connection between the primary and secondary windings, said shaft being hollowed for the reception of said conductors and said primary and secondary windings being spaced apart to provide an air passage therebetween.

In testimony whereof I hereunto affix my signature.

JOHN GUDBRAND TANDBERG.